Figure 1:
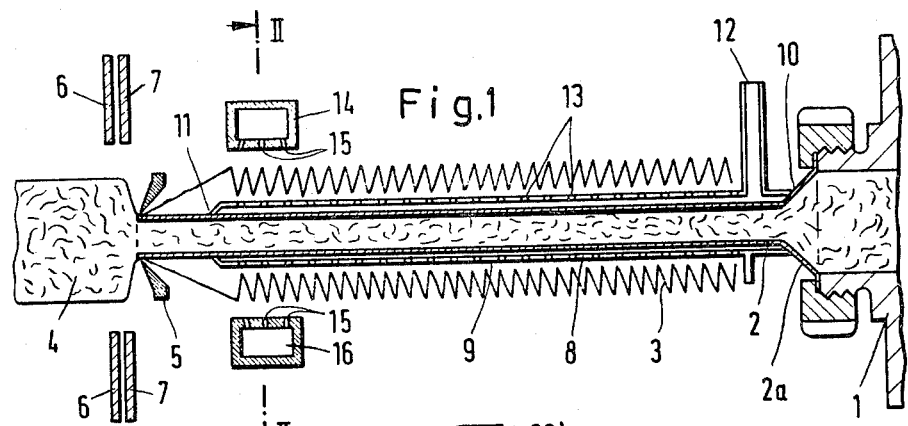

United States Patent [19]

Niedecker

[11] 4,307,489
[45] Dec. 29, 1981

[54] PROCESS AND APPARATUS FOR A PREPARATORY TREATMENT OF GATHERED ARTIFICIAL CASINGS

[76] Inventor: Herbert Niedecker, Am Ellerhang 6, D 6240 Königstein 2, Fed. Rep. of Germany

[21] Appl. No.: 127,025

[22] Filed: Mar. 4, 1980

[30] Foreign Application Priority Data

Mar. 5, 1979 [DE] Fed. Rep. of Germany ....... 2908496

[51] Int. Cl.³ .............................................. A22C 13/00
[52] U.S. Cl. .......................................... 17/49; 17/41; 17/51
[58] Field of Search ....................... 17/1 R, 41, 42, 51, 17/49

[56] References Cited

U.S. PATENT DOCUMENTS

| | | | |
|---|---|---|---|
| 3,222,192 | 12/1965 | Arnold et al. | 17/42 X |
| 3,616,489 | 11/1971 | Voo et al. | 17/51 X |
| 4,127,918 | 12/1978 | Trimble | 17/41 |

*Primary Examiner*—Willie G. Abercrombie
*Attorney, Agent, or Firm*—Sprung, Felfe, Horn, Lynch & Kramer

[57] ABSTRACT

In the filling of artificial casings with comminuted material to form sausages, comprising pretreating a casing with a warm aqueous fluid, and thereafter filling said pretreated casing with said comminuted material while said casing is gathered in bellows form on the filling tube of a filling machine, the improvement which comprises effecting said pretreatment while said casing is on said filling tube. An apparatus therefor is provided whereby the fluid can be applied to the inside and/or outside of the casing.

20 Claims, 10 Drawing Figures

PROCESS AND APPARATUS FOR A PREPARATORY TREATMENT OF GATHERED ARTIFICIAL CASINGS

This invention relates to a process and apparatus for a preparatory treatment of artificial casings which have been gathered to form bellows in the production of sausages.

Particularly in the packaging of sausage products it is known to gather artificial casings so as to form bellows and to draw them onto the filling tube of the filling machine. Successive portions of the artificial casing are then filled with the sausage meat and are thereafter cut off and subsequently closed by a closing machine.

Before the artificial casing is drawn onto the filling tube, it is necessary, as a rule, to pretreat the artificial casing so that it will be suitable for the subsequent filling and closing operations. That pretreatment consists in most cases of watering and may supplement a previous treatment imparted to the artificial casing, e.g., in the factory in which the artificial casing was made, for instance a treatment with glycerine or other chemicals. Watering is particularly necessary because in the dry state in which the artificial casing is delivered it is smaller in diameter than in a moist state. Unless it is watered, the dry artificial casing will expand when it has received the moist sausage meat and the resulting sausage will then soon slacken and assume a poor appearance.

The watering to which the artificial casing is subjected for this reason is often used also to rinse off chemicals, such as the above-mentioned glycerine, which have been added to the artificial casing, e.g., for preservation.

The previously used watering and moistening operations are relatively time-consuming and, above all, they are not reliably reproducible. In the known practice the gathered artificial sausage casings are placed for about 20 minutes in a water bath at about 40° C. It has been found that that temperature generally is not maintained throughout a workday because watering is effected mostly in simple water tubs. Besides, the water becomes enriched in the course of time with the preserving substances which have been washed off and leached. Any lubricant which may have been added to the artificial sausage casing will become contaminated unless it can be washed off. Any salt solutions which may be required for watering with a view to the composition of the material of the artificial casing will be subjected to fluctuations in concentration. By experience, the water tubs are often used to rinse implements which have been employed so that the artificial casings being watered are contacted by the sausage meat which has been washed off.

It is the object of the invention to provide a process and apparatus which are of the kind described first hereinbefore and which can be used for a hygienically satisfactory and rapid pretreatment of artificial casings to be used for packaging foodstuffs. In the process according to the invention that object is accomplished in that the artificial casing is arranged in known manner on a filling tube of a filling machine and an aqueous fluid at a comparatively high temperature is uniformly applied to the artificial casing throughout its periphery.

It is apparent that in the process according to the invention the artificial casings are pretreated directly on the filling machine. The aqueous fluid consists in most cases of water or wet steam at a temperature above 70° C. and is applied to the inside and/or outside surface of the artificial casing so that the latter is contacted only with clean water. The water which has been used may be collected and purified and may then be reapplied to the casing.

It has been found that where water at a temperature above 70° C. is used as an aqueous fluid, the usually relatively short time for which the artificial casing remains on the filling tube is usually sufficient for achieving the desired result, which resides in a soaking of the casing with moisture and, if desired, a removal of undesired preserving agents. Because the preliminary watering of the artificial casing is effected during the actual filling operation, the previous need for a proceding separate watering treatment is virtually completely avoided.

In accordance with the invention, the conditioning of the artificial casing on the filling tube may be intensified in that the aqueous fluid is applied under superatmospheric pressure. It is also within the scope of the invention to pretreat the artificial casings with a chemical, such as propylene glycol. The chemical agent is then activated by the aqueous fluid so that the watering can be carried out within much shorter time and/or at a lower temperature.

The apparatus according to the invention is characterized in that the filling tube is surrounded by means for applying fluid to the outside surface of the artificial casing and/or by means disposed within the artificial casing and adapted to apply fluid to the inside surface of said casing. The apparatus according to the invention may be used to apply aqueous fluid to the inside and/or outside surfaces of an artificial casing arranged on the filling tube. The essential advantage of the apparatus according to the invention resides in that no structural alterations of the previously known filling machines are required. The means for applying aqueous fluid to the inside and/or outside surface of the casing are attachments, which may be provided on new filling machines or on machines of that kind which are already in use.

In accordance with the invention the means for applying aqueous fluid to the outside surface of the casing comprise a plurality of nozzles for discharging the aqueous fluid. It will be recommendable to provide those nozzles in the form of an annular nozzle array, which surrounds the filling tube, and to subdivide said annular nozzle array and to pivot the resulting nozzle array sectors on a pin. In that case the annular nozzle array can be unfolded to provide good access to the filling tube so that, e.g., the gathered artificial casings can be drawn onto the filling tube in a relatively simple manner.

In a preferred design of the means provided according to the invention for applying aqueous fluid to the inside surface of the casing, the filling tube is surrounded with a clearance by a perforated outer tube and the aqueous fluid is adapted to be supplied to the resulting annular clearance and is applied through the perforations to the inside surface of the artificial casing arranged on the filling tube.

With a view to a most simple and inexpensive design of the apparatus according to the invention, the annular nozzle is provided with a housing, which surrounds the filling tube and has an inlet for the fluid to be applied to the inside surface of the casing. In that case the annular nozzle and the housing are preferably integral in accordance with the invention.

Also in accordance with the invention, a simple feeding of the filling tube is promoted in that the artificial casing is mounted on a holding tube, which is adapted to be slidably fitted onto the filling tube. As the pushing of each gathered artificial casing onto the filling tube may take a certain time, said pushing can be carried out independently of the operation of the filling machine if a plurality of the holding tubes provided according to the invention are held in readiness and are provided with respective gathered artificial casings and the next following assembly consisting of a holding tube and an artificial casing is quickly fitted on the filling tube whenever the artificial casing previously provided on the filling tube has been consumed.

It is recommendable in accordance with the invention to provide a holding tube, which has one bead or a plurality of spaced apart beads adjacent to the nozzles for applying aqueous fluid to the outside surface of the artificial casing and, if desired, to form said bead or beads with bores for applying aqueous fluid to the inside surface of the artificial casing. These beads serve primarily to expand to a certain extent the previously gathered artificial casing so that a more intense moistening is effected because the artificial casing has substantially no wrinkles in this area. As a rule, the holding tube according to the invention comprises two beads.

For different kinds of sausage it may be desirable or necessary to package portions of the sausage meat in a relatively cold state whereas the aqueous fluid is preferably at elevated temperatures as it is applied to the artificial casing. These requirements can be met if the holding tube is made integrally with the beads from a preferably synthetic material which has a relatively low thermal conductivity and substantially retards the transfer of heat from the hot aqueous fluid to the material to be packaged, which is to be maintained cool and can thus be processed at a relatively low temperature, as is required.

The transfer of heat from the aqueous fluid to the material to be packaged can be particularly effectively prevented if, in accordance with the invention, the filling tube is formed with a jacket for receiving a coolant. In that case a coolant for dissipating the heat which would otherwise be transferred can constantly be circulated.

The invention which has been described hereinbefore can also be used with filling machines which are provided with a pre-arranged turret, which carries a plurality of filling tubes, particularly with two, three or four filling tubes.

Figure 2:
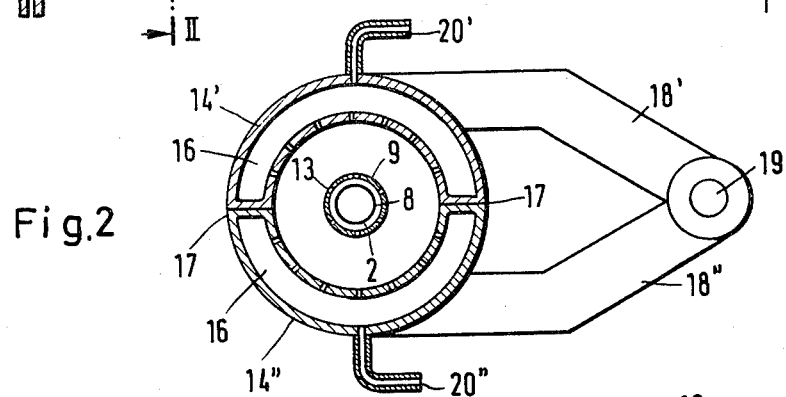
Figure 3:
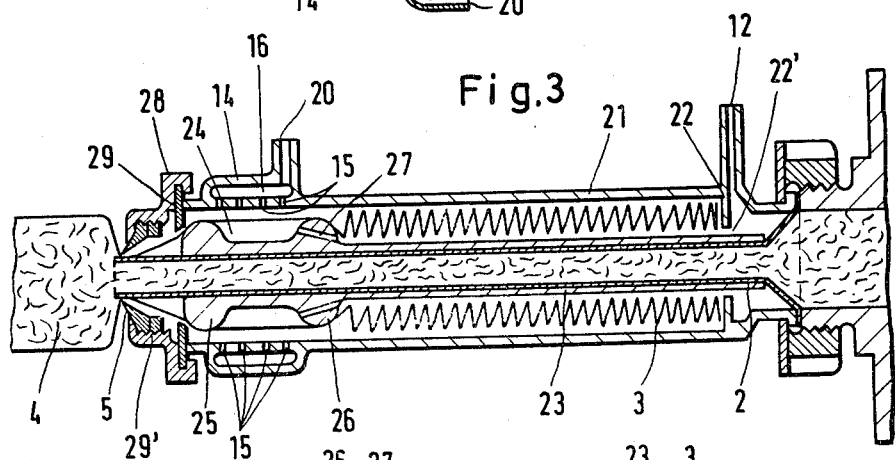
Figure 4:
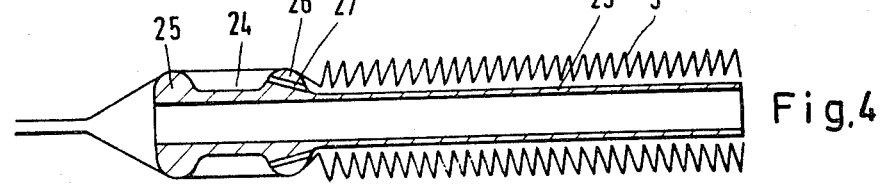
Figure 5:
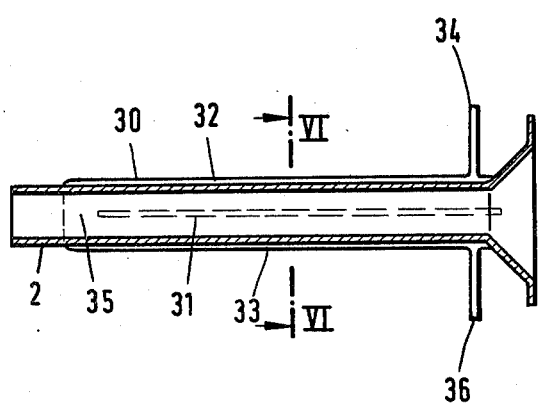
Figure 6:
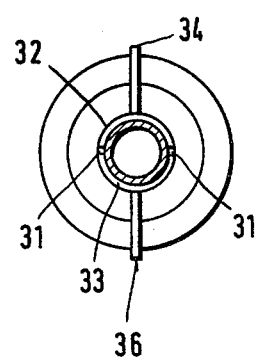
Figure 7:
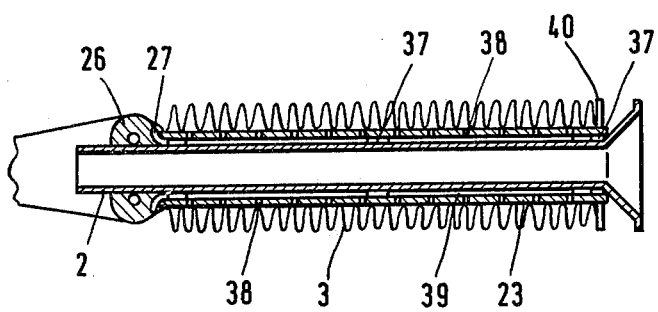
Figure 8:
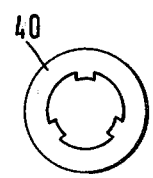

Further details, features and advantages of the invention will become apparent from the following description of a plurality of illustrative embodiments, the claims, and the diagrammatic drawing, in which FIG. 1 is a longitudinal sectional view showing apparatus according to the invention in an embodiment comprising a filling tube which at one end is connected to a filling machine whereas a sausage is being filled at the other end of the tube, FIG. 2 is a sectional view taken on line II—II in FIG. 1, FIG. 3 is a longitudinal sectional view showing a modification of the subject matter of FIG. 1, FIG. 4 is a longitudinal sectional view showing a holding tube for an artificial casing which has been gathered to form bellows, FIG. 5 is a longitudinal sectional view showing other embodiments of a filling tube for use in the apparatus according to the invention, FIG. 6 is a transverse sectional view taken on line VI—VI in FIG. 5, FIG. 7 is a longitudinal sectional view showing another holding tube as shown in FIG. 4, and FIG. 8 is an end view showing an end disc for the holding tube shown in FIG. 7.

Figure 9:
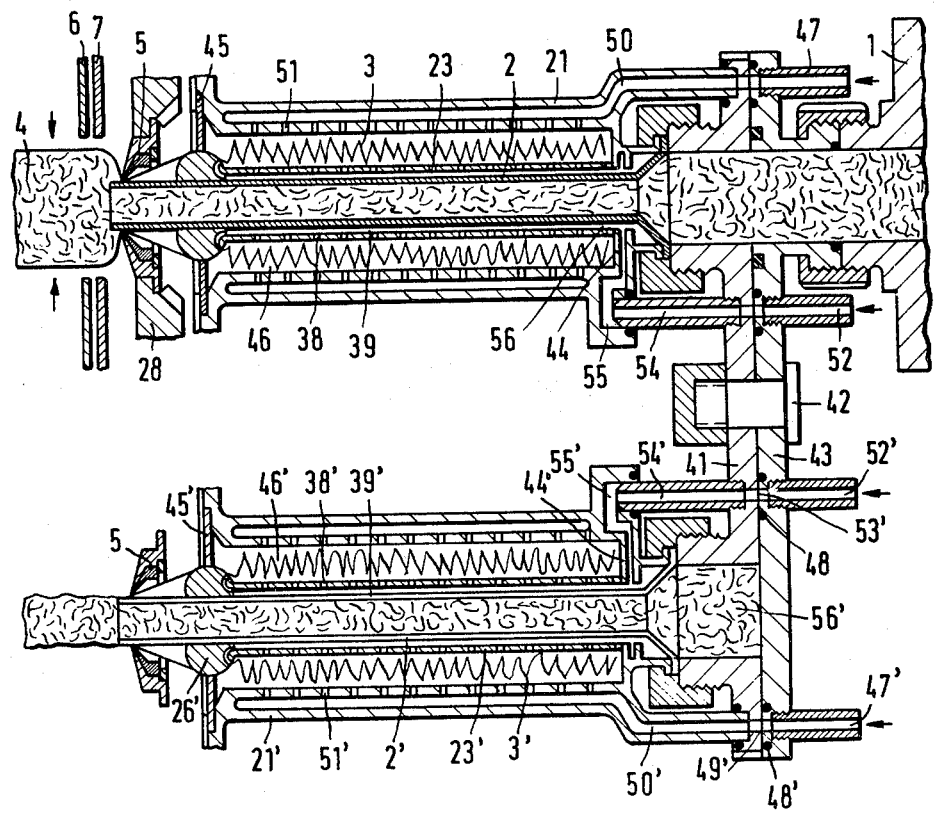
Figure 10:
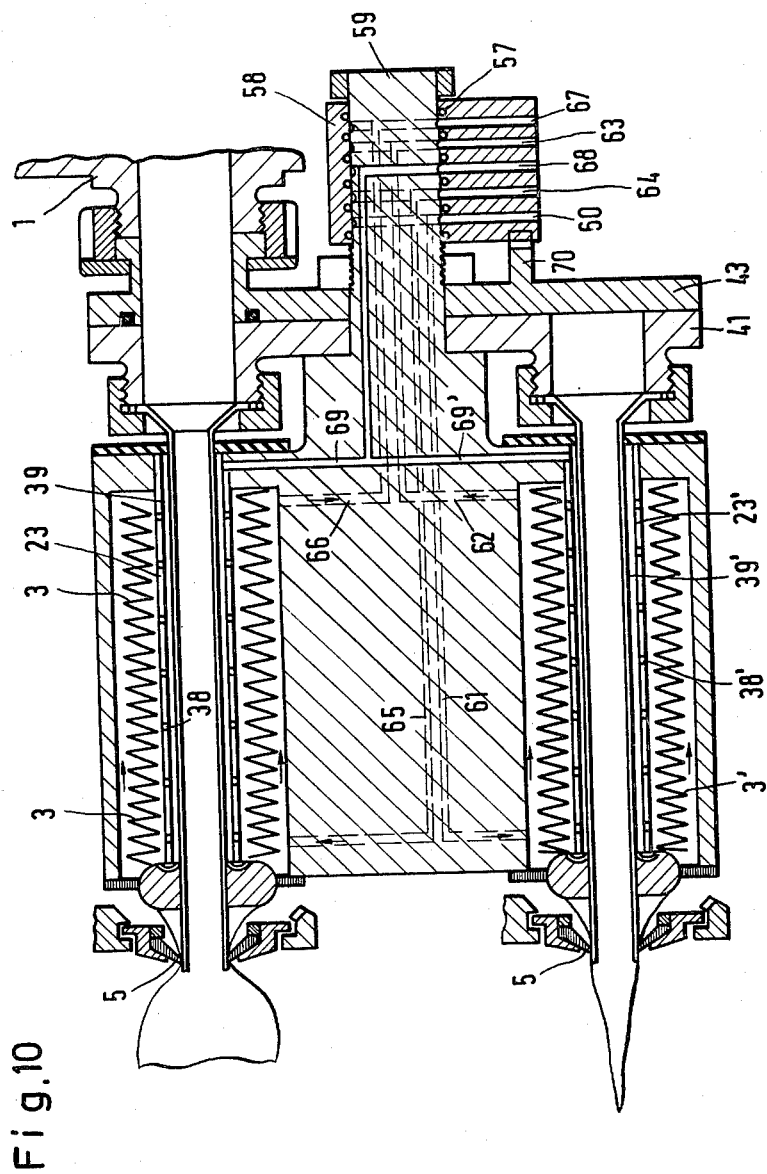

FIGS. 9 and 10 are a longitudinal sectional view showing a filling machine according to the invention having two filling tubes.

Different embodiments of the invention are shown in the drawing. In this connection it is pointed out that identical or similar parts of different embodiments of the apparatus according to the invention are designated with like reference characters.

In accordance with FIG. 1, an outlet opening 1 of a filling machine, not shown in more detail, is provided at its outlet opening 1 with a filling tube 2. Portions of the material 4 to be packaged, e.g., in a gathered artificial casing 3, are dispensed through the filling tube into the artificial casing. At the end of the filling tube 2 adjacent to a casing snubber 5, the artificial casing 3 is constricted by closing means, such as pairs of squeezing scissors 6, 7, to define successive portions of the packaged material. The unfilled end portions of the artificial casing 3 are then twisted and provided with closing clips.

The filling tube 2 is secured to the outlet opening 1 of the filling machine. It is provided with an outer tube 9, which is usually concentrically fitted on the filling tube 2 to define an annular clearance 8 therewith. Portions 10 and 11 of the outer tube 9 are firmly and liquidtightly joined to the filling tube 2 at a conical connecting flange 2a and at the opposite end of the filling tube 2, respectively.

The outer tube 9 has an inlet 12 and a plurality of outlet openings 13. When the gathered artificial casing 3 has been drawn onto the outer tube 9 of the filling tube 2, aqueous fluid, such as hot water with or without dissolved salt, or wet steam, can be supplied through the inlet 12 and applied to the inside surface of the artificial casing 3. From the inlet 12, that fluid flows through the annular clearance 8 and the openings 13 to the inside surface of the gathered artificial casing 3 drawn onto the outer tube 9.

In addition to the means for applying aqueous fluid to the inside surface of the casing, the embodiment shown by way of example comprises also means for applying aqueous fluid to the outside surface of the gathered artificial casing 3. The latter means comprise an annular nozzle 14, which on the side facing the artificial casing 3 is provided with individual nozzles 15. Aqueous fluid which is supplied through the annular clearance 16 is sprayed or jetted through the nozzles 15 to the outside surface of the artificial casing 3.

The aqueous fluid supplied through the annular nozzle 14 is the same, as a rule, as the aqueous fluid applied to the inside surface of the casing, i.e., it consists of hot water with or without dissolved salt or of wet steam. Alternatively, different aqueous fluids can be applied through the annular nozzle array 14, on the one hand, and the means for applying aqueous fluid to the inside surface of the casing on the other hand. Besides, the described means for applying aqueous fluid to the inside and outside surfaces, respectively, of the casing may be separately mounted and operated, either only the means for applying aqueous fluid to the inside surface of the casing or only the means for applying aqueous fluid to the outside surface of the casing.

The aqueous fluid which is used may be supplied at a controlled rate and a predetermined temperature and under a predetermined pressure through the annular clearance 8 of the filling tube 2 and through the annular space 16 of the annular nozzle array 14. The above-mentioned casing snubber 5 ensures not only the desired withdrawal of the artificial casing 3 but serves also to scrape off the aqueous fluid which has been applied.

If the artificial casing 3 consists of internally coated fibrous tubing, which does not absorb moisture on the inside and to which aqueous fluid is applied only on the outside, the filling tube 2 may be provided with an outside coating which constitutes a heat insulator disposed between the material 4 being packaged and the hot aqueous fluid. In the packaging of certain materials, such as raw sausage meats, this feature may be adopted to prevent an undesired temperature rise, which would result in smearing. For this reason the coating material consists preferably of a poor heat conductor, such as polytetrafluoroethylene or the like.

FIG. 2 shows a split annular nozzle array 14 in a sectional view taken on line II—II in FIG. 1. The annular nozzle array comprises an upper part 14' and a lower part 14", which are joined at a parting plane 17. The upper part 14' and the lower part 14" are secured to respective arms 18' and 18", respectively, with which they are pivoted on a pivot pin 19 and can thus be folded apart. As a result, the annular nozzle array 14 can be unfolded so that a new gathered artificial casing 3 can be more easily drawn onto the filling tube 2. Fittings 20' and 20" are provided for supplying the aqueous fluid to the upper and lower parts 14' and 14", respectively.

FIG. 3 shows a modification of the basic principle of the apparatus according to the invention shown in FIG. 1. The annular nozzle array 14 is integral with a housing 21, which constitutes a water supply pipe and which surrounds the artificial casing 3 mounted on the filling tube 2. In this embodiment, aqueous fluid is supplied to the outside surface of the casing as in the embodiment shown in FIGS. 1 and 2 through the annular nozzle array 14 with its individual nozzles 15. The annular nozzle array 14 is supplied with aqueous fluid through the inlet or fitting 20.

The watering pipe or housing 21 comprises also an inlet 12 for the aqueous fluid to be applied to the inside surface of the artificial casing 3. The housing 21 is provided with a partition 22, which defines a relatively narrow annular clearance 22' which surrounds the filling tube 2 and through which the aqueous fluid entering through the inlet 12 flows through the clearance 22' and is applied to the inside surface of the artificial casing 3 preferably between said casing 3 and the filling tube 2.

Another difference between the embodiments shown in FIGS. 1 and 3 resides in that in FIG. 3 the artificial casing 3 is not fitted directly on the filling tube 2 but on a holding tube 23, which is adapted to be slidably fitted on the filling tube 2. That holding tube 23 is also shown in FIG. 4 together with an artificial casing 3 drawn thereon and has a zone 24 for stretching the artificial casing 4. That stretching zone 24 is defined by two spaced apart beads 25, 26. The bead 26 which faces the inflowing aqueous fluid to be applied to the inside surface of the casing is formed with bores 27 for delivering that aqueous fluid under the artificial casing 3 also adjacent to the stretching zone 24.

In the embodiment shown in FIG. 3 the housing 21 is provided adjacent to the closing elements with a closure member 28, which is adapted to be swung down so that the housing 21 can be substantially liquid-tightly sealed. The pivoted closure member 28 contains not only the casing snubber 5 but also a sealing membrane 29, by which the aqueous fluid is substantially retained in the housing 21. When the closure member 28 has been swung down, the housing 21 is open to receive the gathered artificial casing 2 or the holding tube 23 on which the artificial casing 3 is arranged. Finally, the closure member 28 contains also a nut 29' for adjusting the casing snubber 5. For this purpose the closure member 28 is provided with internal screw threads.

FIGS. 5 and 6 show a filling tube 2 for such foodstuffs, specifically for special kinds of sausage meat which must not be warmed so that a supply of heat by the hot aqueous fluid must be minimized. For this purpose the filling tube 2 shown in FIG. 5 and 6 is double-walled. The filling tube 2 is again concentrically surrounded by an outer tube 30. The resulting clearance is divided by two webs 31 into an upper chamber 32 and a lower chamber 33. The coolant, such as cooled water, is supplied through an inlet 34 and flows through the upper chamber 32 to the connecting passage 35 and then through the outer chamber 33 and exits at the outlet 36.

As is shown in FIG. 7, the holding tube 23 can be designed to define with the filling tube 2 an annular clearance 39 in order to contribute to the application of aqueous fluid to the inside surface of the artificial casing 3. For this purpose, the filling tube 2 is provided with spacing webs 37 and the holding tube 23 is provided with a number of openings 38, through which aqueous fluid supplied according to FIG. 3 flows from the annular clearance 39 to the inside surface of the artificial casing 3. At that end which faces the filling machine, the holding tube 23 is provided with a detachable closing disc 40, which is shown in FIG. 8 and prevents slipping of the artificial casing 3.

In accordance with FIG. 7, the bead 26 of the holding tube 23 is also provided with a bore or aperture 27, through which the aqueous fluid can flow from the annular clearance 39 also to the outside surface of the artificial casing 3.

The previously described apparatus for a fast and hygienically satisfactory pretreatment of artificial sausage casings may obviously be used also on filling machines having a filling tube turret. FIG. 9 is a longitudinal sectional view showing the two filling tubes 2, 2' and the two holding tubes 23, 23' of a filling machine having a turret provided with two filling tubes. These filling tubes 2, 2' and respective holding tubes 23, 23' mounted thereon are carried by a turntable 41, which is rotatably mounted on the baseplate 43 by means of a shaft 42. The filling tubes 2, 2' are so provided on the turntable 41 that the filling tube 2 is disposed in front of the outlet opening 1 of the filling machine and the other filling tube 2' is disposed outside said outlet opening and usually diametrically opposite thereto.

In the present case, holding tubes 23, 23' are mounted on the respective filling tubes 2, 2' in the manner shown in FIG. 7.

The pairs of squeezing scissors 6, 7 being open, successive portions of foodstuff are being fed into the filling tube 2, which is connected to the outlet opening 1 as shown in FIG. 1. The opposite filling tube 2' is not involved in a filling operation in this position. During that time the empty holding tube 23' can be removed from the filling tube 2' and can be provided with a new gathered artificial casing 3' and can then be pushed onto the filling tube 2' as far as to the stop 44' and may thereafter be locked in position, if desired. In this position the bead 26' contacts the sealing lip 45' of the housing 21' and slightly seals the interior 46' of the housing 21' so that the aqueous fluid can now be applied to the inside and outside surfaces of the artificial casing 3'. The aqueous fluid can be automatically supplied and withdraws through valves by means of a pump. The pump can be controlled in such a manner that the aqueous fluid is pumped off before the empty holding tube is removed and the supply of the aqueous fluid is not resumed until the new holding tube 23 carrying the artificial casing 31 has been fitted. Controlled valves may also be provided to ensure that the watering fluid which has been pumped off is purified in a filter cycle.

The fluid to be applied to the outside surface of the artificial casing 3' enters through the conduit fitting 47' of the fixed baseplate 43 and flows through the gap 49' between the fixed baseplate 43 and the turntable 41 into the passage 50' of the housing 21' and further through nozzles 51' to the outside surface of the artificial casing 3'. The gap 49' is sealed by a seal 48.

The aqueous fluid to be applied to the inside surface of the artificial casing 3' is similarly conducted. This fluid enters and exits through the fitting 52' and flows through the gap 53' into the conduit 54' and further through the annular passage 55' and the annular clearance 39' in the holding tube 23' and through the openings 38' to the inside surface of the artificial casing 3'.

When the turret provided with two filling tubes is releasably locked in the illustrated position, the connected conduits 47' and 52' register with the passage 50' and the conduit 54', respectively. Aqueous fluid is applied to the inside and outside surfaces of the artificial casing 3' during the time in which portions of the material to be packaged are fed into the artificial casing 3, which has previously been pretreated in this manner and is carried by the filling tube 2.

The fittings 47 and 52 for a watering fluid are normally not required because the assembly which carries a new artificial casing and has been provided with watering fluid is pivotally moved to the filling and closing station.

In this case the conduits 50' and 54' are closed by the baseplate 43. The contents of the watering assembly is sufficient for a continued moistening of the artificial casing 3 also in the filling station. If a more intense treatment of the artificial casing 3 is desired, additional aqueous fluid may be supplied to the fittings 47 and 52, which register with the conduits 54 and 50, respectively.

When the artificial casing 3 has been consumed, the turntable 41 is turned through one-half of a revolution to the receiving position so that the pretreated artificial casing 3' assumes the filling position.

It will be understood that the stepwise rotation of the turntable 41 on the shaft 42 can be cyclically controlled automatically (not shown). In such an arrangement the fittings 47, 47' and 52, 52' on the fixed baseplate 41 remain also stationary.

FIG. 10 is a longitudinal sectional view showing a modification of the turret shown in FIG. 9 and having two filling tubes. In this case the aqueous fluid to be applied to the inside and/or outside surface of the artificial casing is supplied through the shaft 59, which rotates with the turntable and is rotatably mounted in the baseplate 43. For instance, the aqueous fluid to be applied to the outside surface of the artificial casing 3' is supplied through the fitting 60 and then flows through the passage 61 and around the outside surface of the artificial casing 3' and back through the passage 62 and the fitting 63.

The watering fluid to be applied to the outside surface of the artificial casing 3, 3' is supplied through the fitting 64 and flows through the passage 65 and around the outside surface of the artificial casing 3 and back through the passage 66 and the fitting 67.

Aqueous fluid to be applied to the inside surface of the artificial casings 3, 3' is supplied through fitting 68 and flows through the passages 69, 69' into the annular clearances 39, 39' in the holding tubes 23, 23' and through the openings 38, 38' to the inside surfaces of the artificial casings, 3, 3'. As this aqueous fluid enters the artificial casing, it cannot flow back but is subsequently scraped off by the snubbing lip 5. The shaft 59 containing the conduits is rotatably mounted in the feed head 58. The individual conduits are separated by sealing rings 57. The feed head 58 is held against rotation by a recessed lug 70 carried by the baseplate 43.

It will be appreciated that the instant specification and examples are set forth by way of illustration and not limitation, and that various modifications and changes may be made without departing from the spirit and scope of the present invention.

I claim:

1. In the filling of artificial casings with comminuted material to form sausages, comprising pretreating a casing with a warm aqueous fluid, and thereafter filling said pretreated casing with said comminuted material while said casing is gathered in bellows form on the filling tube of a filling machine, the improvement which comprises effecting said pretreatment while said casing is on said filling tube.

2. A process according to claim 1, wherein the aqueous fluid is at a temperature above about 70° C.

3. A process according to claim 1, wherein the aqueous fluid is water.

4. A process according to claim 1, wherein the artificial casing is pretreated with a chemical which is at least partially dissolved into said aqueous fluid.

5. In the filling of artificial casings with comminuted material to form sausages, comprising gathering a casing to form a bellows on a filling tube of a filling machine, closing the downstream end of said bellows, supplying said comminuted material to said filling tube whereby it enters the bellows and draws the casing forwardly off the filling tube, and periodically closing the filled casing to form a sausage and to form a new closed downstream end for the next sausage, the improvement which comprises continuously applying to the periphery of said casing while on said filling tube and before being filled with comminuted material a warm aqueous fluid thereby to prepare the casing for being filled, and continuously removing spent aqueous fluid after application to said casing.

6. An apparatus for effecting the process of claim 1, comprising a filling machine, a filling tube for registry with said machine, and means for applying fluid to the outside of said tube whereby when a casing is on said tube said fluid is applied to said casing.

7. An apparatus according to claim 6, including means for removing spent fluid after application to said tube.

8. An apparatus according to claim 6, wherein the fluid applying means is spaced from the tube thereby to apply fluid to the outside of a casing on said tube.

9. An apparatus according to claim 6, wherein the fluid applying means is in direct contact with the outside of said tube thereby to apply fluid to the inside of a casing on said tube.

10. An apparatus according to claim 8, wherein the fluid applying means comprises a plurality of nozzles for discharging the aqueous fluid.

11. An apparatus according to claim 10, wherein the nozzles for applying aqueous fluid to the outside surface of the casing are combined in an annular nozzle array.

12. An apparatus according to claim 11, wherein the annular nozzle array is subdivided and the parts thereof are pivoted on a pin.

13. An apparatus according to claim 9, wherein the fluid applying means comprises an outer tube surrounding said filling tube and spaced therefrom to form a fluid chamber, and means for supplying fluid to said chamber, said outer tube being provided with openings whereby fluid supplied to said chamber leaves through said openings to be applied to the inside of a casing surrounding both said tubes.

14. An apparatus according to claim 11, including a housing surrounding the filling tube, the annular mozzle array being connected with said housing, said housing being provided with an inlet for aqueous fluid positioned upstream of the casing, whereby the aqueous fluid can be applied to the inside of the casing on the tube within the housing.

15. An apparatus according to claim 6, including a holding tube removably mounted on said filling tube, whereby a casing can be gathered on said holding tube at a location remote from the filling machine and the holding tube and casing can be slid over the filling tube.

16. An apparatus according to claim 15, wherein the holding tube adjacent its downstream end has at least one enlarged bead to stretch a casing as it passes over said bead and is wet by applied fluid.

17. An apparatus according to claim 16, wherein the holding tube has two spaced beads to form a stretch zone there between, the upstream bead being provided with openings, whereby fluid supplied upstream of said supstream bead to a space between said holding tube and a casing thereon can enter said stretch zone.

18. An apparatus according to claim 16, wherein the holding tube and bead are integral and formed of a material of low thermal conductivity.

19. An apparatus according to claim 6, wherein the filling tube is double-walled, the apparatus including means for supplying coolant to the space between the walls of the double-walled filling tube.

20. An apparatus according to claim 6, wherein the filling machine includes a rotatable turret with a plurality of filling tubes, means for applying fluid being provided for each filling tube of said turret.

* * * * *